United States Patent [19]

Yoder et al.

[11] Patent Number: 5,644,761

[45] Date of Patent: Jul. 1, 1997

[54] BASIC OPERATIONS SYNCHRONIZATION AND LOCAL MODE CONTROLLER IN A VLSI CENTRAL PROCESSOR

[75] Inventors: Ronald W. Yoder, Mesa; Ronald E. Lange, Glendale; William A. Shelly, Phoenix; Russell W. Guenthner, Glendale; Richard L. Demers, Peoria, all of Ariz.

[73] Assignee: Bull HN Information Systems Inc., Billerica, Mass.

[21] Appl. No.: 893,871

[22] Filed: Jun. 5, 1992

[51] Int. Cl.$^6$ ................................................. G06F 9/22
[52] U.S. Cl. ................................. 395/595; 395/427
[58] Field of Search .................... 395/375, 800, 395/595, 427

[56] References Cited

U.S. PATENT DOCUMENTS

| | | | |
|---|---|---|---|
| 4,168,523 | 9/1979 | Chari et al. | 395/425 |
| 4,179,736 | 12/1979 | Wilhite | 395/375 |
| 4,415,969 | 11/1983 | Bayliss et al. | 395/375 |
| 4,459,666 | 7/1984 | Kruger | 395/425 |
| 4,554,627 | 11/1985 | Holland et al. | 395/375 |
| 4,587,611 | 5/1986 | Amdahl et al. | 395/375 |
| 4,598,365 | 7/1986 | Boothroyd et al. | 395/375 |
| 4,890,218 | 12/1989 | Bram | 395/375 |
| 5,136,696 | 8/1992 | Beckwith et al. | 395/375 |

OTHER PUBLICATIONS

Mano M. Morris, "Computer System Architecture", 2nd Edition, 1982, pp. 290–294.

*Primary Examiner*—Parshotam S. Lall
*Assistant Examiner*—Zarni Maung
*Attorney, Agent, or Firm*—J. S. Solakian; J. H. Phillips

[57] ABSTRACT

In order to efficiently undertake the micro-steps required to execute an extended instruction in a central processing unit, a main sequence controller and a separate basic operations controller having its own sequencer and the ability to run semi-autonomously are provided. Normally, the main sequence controller determines the operation of the basic operations controller, but, in the case of execution of, for example, a multi-word instruction requiring extended basic operations, the basic operations controller temporarily takes control over the main controller until the extended basic operations have been completed. The result is a relatively simple sequencer that supports tight micro-coded functions where many of the sequence decisions can be predetermined.

9 Claims, 3 Drawing Sheets

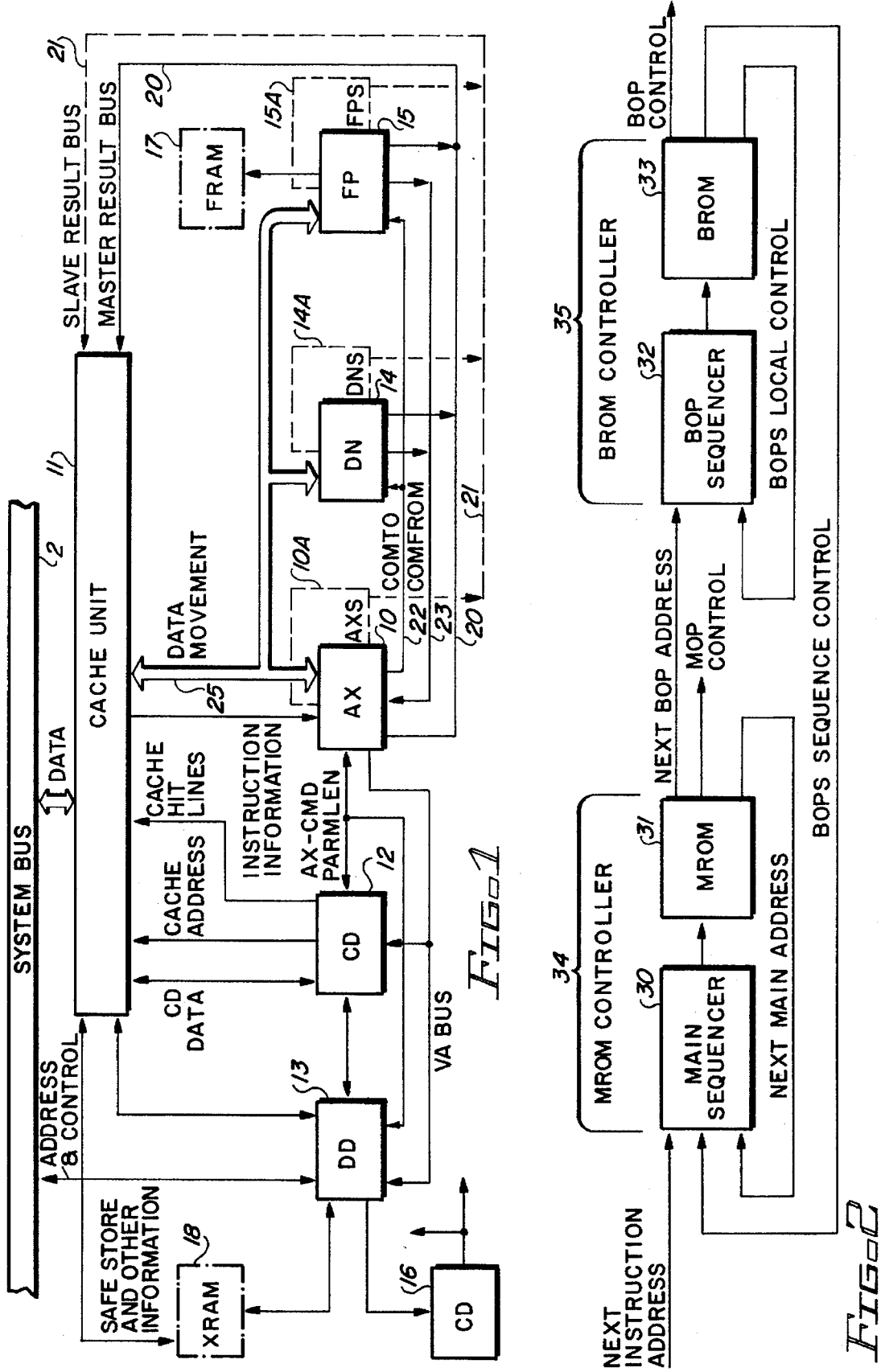

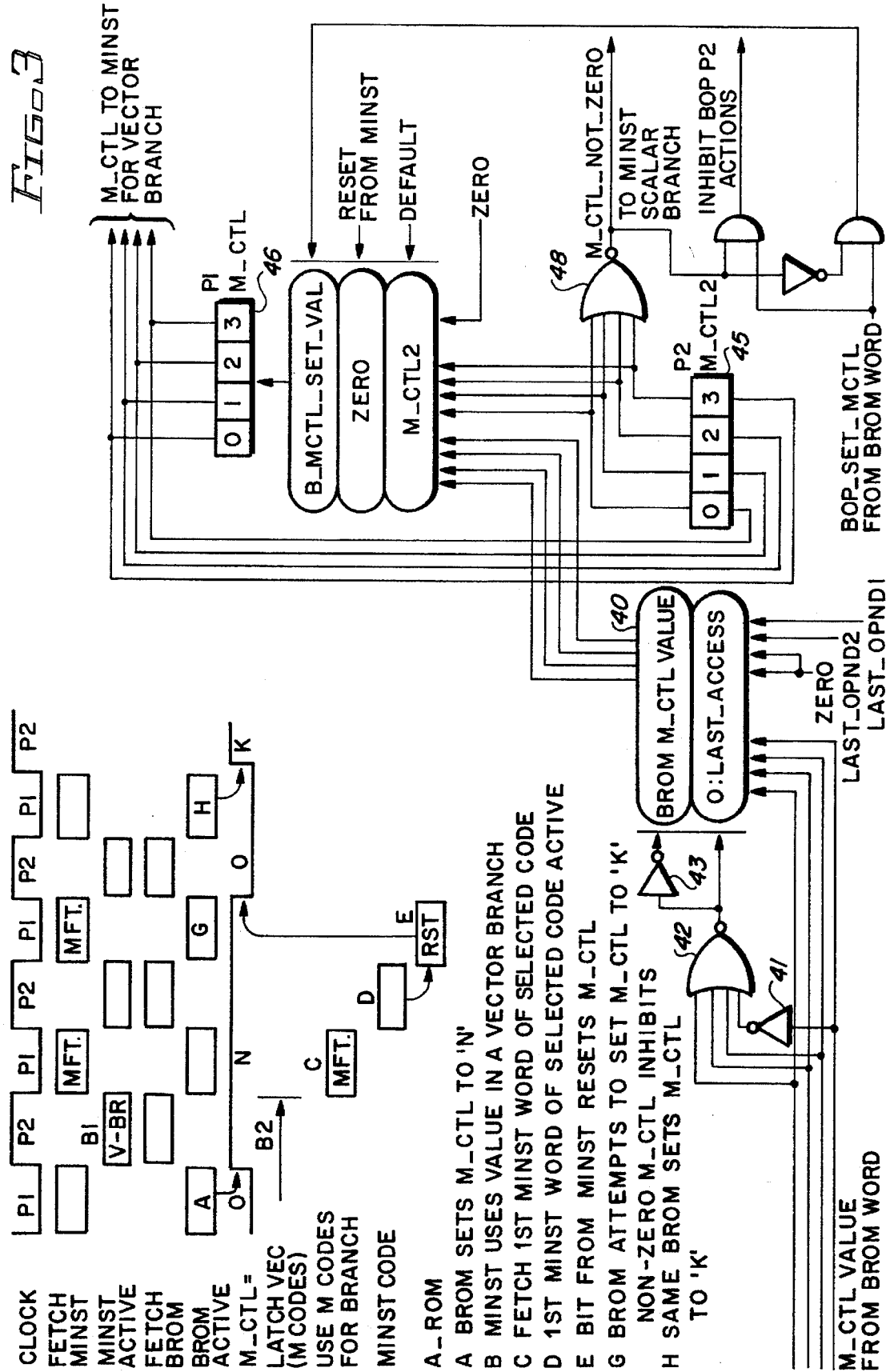

1

BASIC OPERATIONS SYNCHRONIZATION AND LOCAL MODE CONTROLLER IN A VLSI CENTRAL PROCESSOR

FIELD OF THE INVENTION

This invention relates to central processors and, more particularly, to sequence control of operations required to execute multi-word instructions in a central processor.

BACKGROUND OF THE INVENTION

As faster operation of computers has been sought, numerous hardware/firmware features have been employed to achieve that purpose. One widely incorporated feature directed to increasing the speed of operation is pipelining in which the various stages of execution of a series of consecutive machine level instructions are undertaken simultaneously. Thus, during a given time increment, a first stage of a fourth (in order of execution) instruction may be undertaken while a second stage of a third instruction, a third stage of a second instruction and a fourth stage of a first instruction are all undertaken simultaneously. This procedure dramatically increases the speed of operation of a computer system.

The execution of certain instructions, such as multi-word instructions, requires holding the pipe in one stage for a plurality of clock phases. An example of such instructions in the data processing system forming the environment of the exemplary embodiment is the family of Extended Instruction Set (EIS) instructions. The EIS instructions are functionally centered around sequences of basic operations functions, and a number of intra-execution sequence and/or control decisions must be made based on the characters being processed. The main instruction controller is too far removed from the data upon which the decisions must be made to efficiently control the sequence of the basic operations necessary to execute these instructions. The result, in the absence of the application of the present invention, is very slow EIS instruction execution and a requirement for much more micro-code than will readily fit within the address and execution integrated circuit chip.

It may be noted that a directly corresponding problem exists in processors which do not employ a pipeline, but do include in their repertoires instructions which require unusually extensive data manipulation extending over several clock cycles. The present invention also finds application in such processors.

OBJECTS OF THE INVENTION

It is therefore a broad object of this invention to provide for the efficient execution of extended instructions which rely on the interpretation of intermediate results for the selection of successive basic operations to be performed during instruction execution.

It is a more specific object of this invention to provide a central processor instruction execution control subsystem that includes a main sequence controller and also a basic operations sequence controller which is normally under control of the main controller, but which assumes temporary control over the main sequence controller during the execution of instructions which require extensive basic operation sequences.

SUMMARY OF THE INVENTION

Briefly, these and other objects of the invention are achieved by providing a main sequence controller and a separate basic operations controller having its own sequencer and the ability to run semi-autonomously. Normally, the main sequence controller determines the operation of the basic operations controller, but, in the case of execution of, for example, a multi-word instruction requiring an extended sequence of basic operations, the basic operations controller temporarily takes control over the main controller until the extended basic operations have been completed. The result is a relatively simple sequencer that supports tight micro-coded functions where many of the sequence decisions can be predetermined.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 a block diagram of a central processing unit in which the subject invention is employed;

FIG. 2 is a block diagram of sequencer logic, according to the present invention, in the central processing unit of FIG. 1;

FIG. 3 is a logic diagram of a communications section of the sequencer logic.

DESCRIPTION OF THE PREFERRED EMBODIMENT(S)

Figure 4:
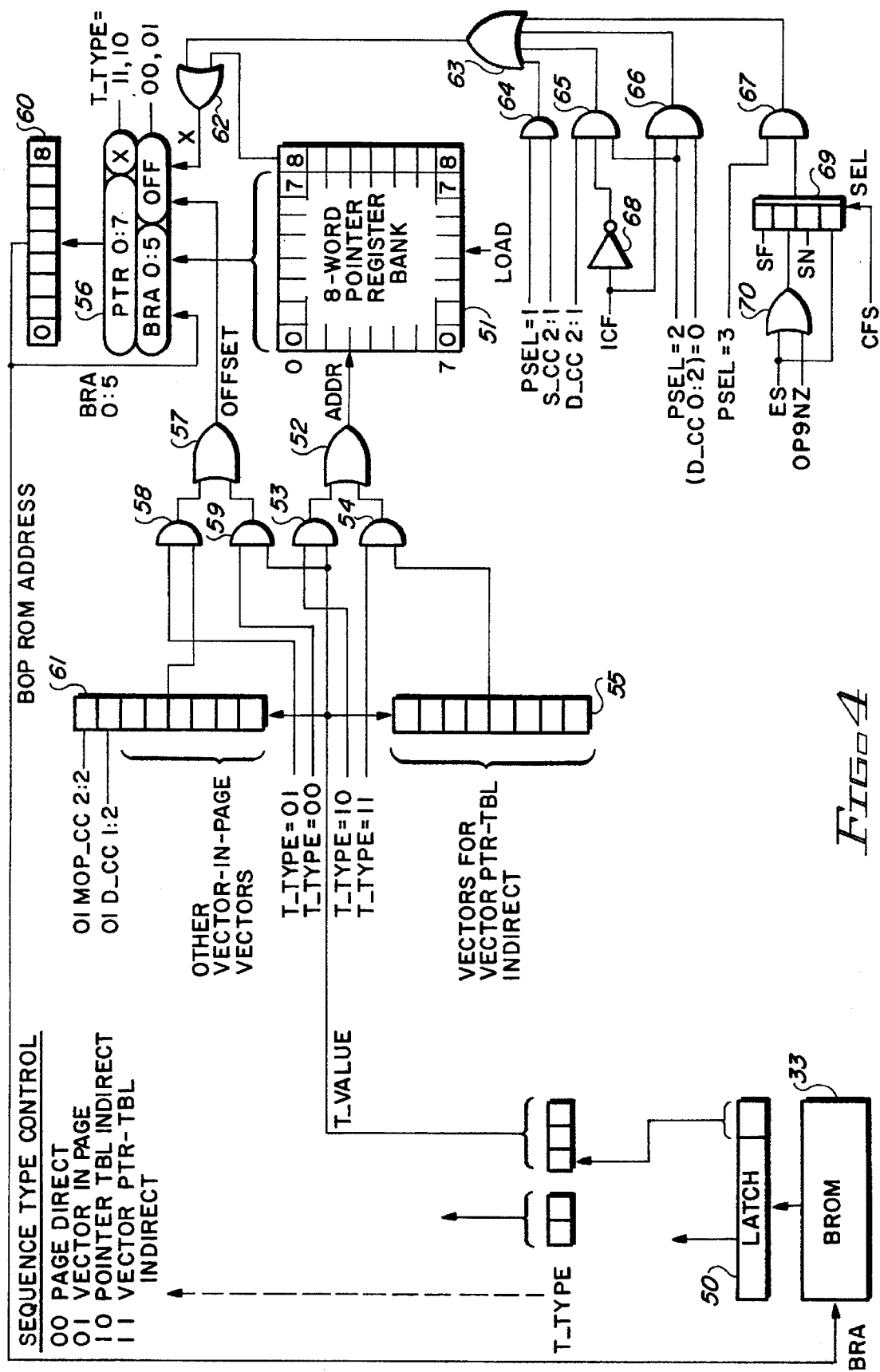
FIG. 4 is a logic diagram of a local addressing section of the sequencer logic.

Referring to FIG. 1, the Address and Execution Unit (AX unit) is a microprocessing engine which performs all address preparation and executes all instructions except decimal arithmetic, binary floating point and multiply/divide instructions. Two identical AX chips 10, 10A perform duplicate actions in parallel, and the resulting AX chip outputs are constantly compared to detect errors. The main functions performed by the AX unit include:

effective and virtual address formation;

memory access control;

security checks;

register change/use control;

execution of basic instructions, shift instructions, security instructions, character manipulation and miscellaneous instructions.

The cache unit 11 includes a data part of 64K bytes (16K words) and a set associative directory part which defines the main memory location of each 64-byte (16-word) block stored in the cache data part. Physically, the cache unit is implemented in an array of ten DT chips and has directly associated with it a cache directory (CD) chip 12 and a duplicate directory (DD) chip 13.

The specific functions performed by the cache unit 11 include:

combined instruction and operand data storage;

instruction and operand buffering and alignment;

data interface with the system bus 7 (FIG. 1);

CLIMB safestore file.

Two copies of the cache directory information are respectively maintained in the CD and DD chips which perform different logic functions. The two directory copies allow interrogation of the cache contents from the system bus in parallel and without interference with instruction/operand access from the CPUs and also provide for error recovery. Functions performed by the CD chip 12 include:

cache directory for CPU accesses;

instruction, operand and store buffer management;

virtual-to-real address translation paging buffer.

Functions performed by the DD chip 13 include:

cache directory for system accesses;

system bus control;

distributed connect/interrupt management;

cache directory error recovery.

Efficient scientific calculation capability is implemented on the Floating Point (FP) coprocessor chips 15, 15A. The identical FP chips execute all binary floating point arithmetic in duplicate. These chips, operating in concert with the duplicate AX chips 10, 10A, perform scalar or vector scientific processing.

The FP chip 15 (duplicated by the FP chip 15A):

executes all binary and fixed and floating point multiply and divide operations;

computes 12 by 72-bit partial products in one machine cycle;

computes eight quotient bits per divide cycle;

performs modulo 15 residue integrity checks.

Functions performed by the FP chips 15, 15A include:

executes all floating point mantissa arithmetic;

executes all exponent operations in either binary or hexadecimal format;

preprocesses operands and postprocesses results for multiply and divide instructions;

provides indicator and status control.

Two special purpose random access memories (FRAM 17 and XRAM 18) are incorporated into the CPU. The FRAM chip 17 is an adjunct to the FP chips 15, 15A and functions as an FP control store. The XRAM chip 18 is an adjunct to the AX chips 10 10A and serves as a scratchpad as well as providing safestore and patch functions.

The CPU also employs a Clock Distribution (CK) chip 16 whose functions include:

clock distribution to the several chips constituting the CPU;

shift path control;

maintenance;

interface between an external Clock and Maintenance Unit and CPU;

provision of clock stop logic for error detection and recovery.

The DN chip 14 (in parallel with the DN chip 14A) performs the execution of decimal numeric Extended Instruction Set (EIS) instructions. It also executes Decimal-to-Binary (DTB), Binary-to-Decimal (BTD) conversion EIS instructions and Move-Numeric-Edit (MVNE) EIS instructions in conjunction with the AX chip 10. The DN chip both receives operands from memory and sends results to main memory (not shown) via the cache unit 11.

The AX, DN and FP chips, collectively, are sometimes referred to as the Basic Processing Unit (BPU). It was previously noted that the AX, DN and FP chips are duplicated with the duplicate units operating in parallel to obtain duplicate results which are available for integrity checking. Thus, master and slave results are obtained in the normal operation of these chips. The master results are placed onto a Master Result Bus (MRB) 20 while the slave results are placed onto a Slave Result Bus (SRB) 21. Both the master and slave results are conveyed, on the MRB and SRB respectively, to the cache unit 11. In addition, a COMTO ("command to") bus 22 and a COMFROM ("command from") bus 23 couple together the AX unit, the DN unit and the FP unit for certain interrelated operations.

Referring now to FIG. 2, the AX chip 10 of the CPU shown in FIG. 1 incorporates two cooperating controllers for effecting instruction execution. In each case, the detailed information for carrying out and/or controlling a program execution step is permanently stored in a read-only-memory (ROM). The MROM controller 34, which receives instruction information from cache, includes the main sequencer 30 and the Main ROM or MROM 31 which stores main sequence control words. The BROM controller 35 includes the basic operations sequencer 32 and the Basic Ops ROM or BROM 33 which stores basic operations sequence control words. FIG. 2 illustrates these components and the main signals which couple them.

The MROM controller 34 handles the address preparation and cache command generation, all of the early cycle interface to the other chips of the CPU and the main sequence of each instruction. The BROM controller 35 handles most of the arithmetic functions of the instructions and the programmable registers and generally receives and sends the operand data and handles the interface control lines for data (i.e., late pipeline cycle control).

The exemplary CPU of FIG. 1 is a pipelined processor in which certain operations involved in the preparation and execution of sequential instructions are performed in an overlapping manner. Thus, merely by way of example, the controllers may direct the data manipulation logic to sequentially commence an instruction transfer/instruction decode (IT/ID) phase of a new instruction in the pipe, an effective address/virtual address (EA/VA) phase of the instruction immediately ahead, a virtual-to-real/cache access (VR/CA) phase of an instruction ahead two positions in the pipe and an operand/execution (OP/EX) phase of a instruction at the end of the pipe.

For most instructions, the MROM and BROM controllers operate in a locked step fashion in which the MROM controller provides an address (or function) to the BROM controller to be executed in a subsequent cycle. The BROM controller executes one cycle; i.e., one basic operation in a given clock period, for each cycle sent by the MROM controller. The MROM controller provides control to the EA/VA cycles while the BROM controller provides control to the OP/EX cycles. In some cases, the BROM controller will be instructed to execute a two or three step sequence under its own control and then wait for more commands from the MROM controller.

However, when the MROM controller receives instruction information representing a request for the CPU to execute one of the Extended-Instruction-Set (EIS) group of instructions, the roles of the MROM and BROM controllers are temporarily reversed. To fully understand the following, it is useful to have a basic knowledge of an exemplary one of the multi-word EIS instructions which are part of the repertoire of the CPU shown in FIG. 1. The multi-word EIS instructions are so named because they require multiple words to specify the task to perform and describe the characteristics of the data to be processed.

The MRL, Move Right to Left, instruction chosen for the example is a multi-word EIS instruction that moves data from one operand to another. The multiple words, in the MRL case, consist of an instruction word (word one), the first operand (sending string) descriptor word (word two, commonly referred to as d1) and the second operand (receiving string) descriptor word (word three, commonly referred to as d2). The operand to be processed is a byte entity, or character. The byte sizes may be either nine bit (ASCII), six bit (BCD) or four bit (packed) in format.

The MRL instruction is used to process variable numbers of bytes starting at a variable byte position within a defined segment. The number of bytes to process (or length) can be, in the exemplary CPU, a value ranging from zero to one million, and a different length may be specified for the two operands. When the lengths vary, either "fill" (the receive length is greater than the sending length) or "truncation" (the sending length is greater than the receiving length) will occur.

An MRL instruction is typically coded as follows:

mrl (a1,r1,i1,e1),(a2,r2,i2,e2)
adsc9 y1,b1,l1,p1
adsc9 y2,b2,l2,p2

Where:

a(n)=ar/dr option selection (nonzero=selected)

r(n)=register length option selection i(n)=indirection option e(n)=register effective address modification option y(n)=an effective address word specification b(n)=a byte offset to the effective address l(n)=the length or number of characters to process p(n)=optional, only valid if a(n) is selected; the operand segment descriptor identifier.

For the EIS group of instructions, it will be seen that the sequence to be executed may depend upon the type of data being handled or the contents of the data itself. In this mode, the BROM controller can be considered the temporary master with the MROM controller being under its control. The BROM controller is placed into a local sequence with considerable branching authority to make decisions based on input data. The MROM controller can execute some sequences, then will go into a waiting loop to branch on certain signals from the BROM controller. The MROM controller then goes on to execute a routine to obtain more data from cache, send data to cache, update length or address counters.

Thus, the BROM Controller 35 (which includes the BOP or Basic OPerations sequencer 32 and the BROM 33 in which coded machine functions control signals in the form of basic operations sequence control words are permanently stored for the execution of most instructions) runs in lock-step with the MROM Controller 34 which includes the main sequencer 30 and the MROM 31 in which other, generally higher level, coded machine functions in the form of main sequence control words are stored. In addition, the MROM 31 can specify a BROM word to be executed. This address is piped down to the BROM controller which performs the specified BOP functions and then waits until another address is piped down from the MROM controller. In this normal mode, the MROM controller is dictating each and every BOP function, and all decisions are made by the MROM controller. (The MROM Controller and its associated circuitry is sometimes referred to as Main INSTruction or MINST while the Basic OPerationS BROM Controller and its associated circuitry is sometimes referred to as BOPS.)

Although the BROM controller 35 can run semi-autonomously of the MROM controller 34, it is always initiated by the MROM controller (which pipes down the starting address), and total control always ultimately returns to the MROM controller when the BROM controller completes a given task. When it is running semi-autonomously, the BROM controller must be able to use the MROM controller for some tasks such as additional cache directory commands and operand address and length updates. Some of these tasks require no explicit feedback such that the MROM controller and the BROM controller can continue to run asynchronously. Other tasks require that the BROM controller wait until the MROM controller reaches some synchronizing point in the requested function. As will be described in more detail below, a one-deep task queue, which includes synchronization logic for the two processes, is used to feed these tasks from the BROM controller to the MROM controller.

As shown in FIG. 3, the heart of the BOPS to MINST task queue is a four-bit register called M_CTL, or main control register. The main characteristics of the operation of this circuitry are:

1. M_CTL will be set by BOPS with a phase 1 clock;
2. MINST will use M_CTL as a four-bit vector for branching;
3. MINST will reset M_CTL; and
4. If M_CTL is non-zero when BOPS attempts to set it, BOPS will "freeze" until M_CTL is cleared to zero.

After MINST has initialized BOPS to perform an asynchronous task, it will drop into a vector branch using M_CTL as the vector value. A value of zero will cause MINST to loop on itself. MINST will therefore wait for a task from BOPS.

BOPS will perform its task independently of MINST until a MINST function is required at which time BOPS will set M_CTL to some non-zero value. If MINST is looping on the vector branch, it will then branch according to the code in M_CTL and start working on the requested function. The function must clear M_CTL prior to returning to the vector branch. If BOPS attempts to set a new value into M_CTL prior to MINST having cleared it, all BOPS actions are inhibited, and BOPS will "hang" until M_CTL is cleared.

To achieve synchronization, BOPS (having given MINST a task) can attempt to set M_CTL to zero. BOPS will then hang until MINST allows it to continue by clearing M_CTL. With BOPS using a value of zero for the synchronizing M_CTL value, no new task is given to MINST, and MINST need not subsequently clear M_CTL.

In summary, the logic of FIG. 3 serves, among other functions, to inform MINST of the present condition of BOPS; viz.: either that BOPS is now executing the EIS instruction essentially independently of MINST, or that BOPS requires action from MINST intermediate execution of the EIS instruction or that BOPS has completed execution of the EIS instruction.

As shown in FIG. 4, the BOPS sequencer is optimized to take into account the limitations on available BOPS microcode words, hard logic space and a clean partitioning of the total task between BOPS and MINST. To minimize the number of bits required within the BROM word, the BROM is organized into "pages" of eight words each in order that branching within a page can be accomplished with a three-bit address.

The BOPS sequence control logic centers around a register bank for storing eight "pointers". Each of the eight pointers addresses a specific function required by an instruction. For instance, in the exemplary CPU, pointer [2] will always point to the code to extract a character from the source string regardless of character size.

The BOPS sequencer control field in a basic operations sequence control word consists of five bits: two bits to describe the type of transfer, and three bits to be used for vector selection, pointer selection, or word within an eight-word page. The two-bit field is called T_TYPE, and the three-bit field is called T_VALUE.

T_TYPE can contain one of the following values given with the associated meaning for each:

"00"—Page Direct

T_VALUE is the address within the current eight-word page of the next BROM word. This allows the code to move around explicitly within an eight-word page such that there is no need to provide address incrementation logic.

"01"—Vector within Page

T_VALUE is used to select one of up to eight vectors that present an address within the current eight-word page. This mechanism supports selection of a micro-code word depending on destination character counter (for final alignment) and on the "IF" field of the edit micro-operators for edit-table character selection.

"10"—Pointer Indirect

Use T_VALUE as an address to the pointer register-file. The pointer thus obtained will be the address of the next BROM word. Pointers are assigned to generic task types and set to address specific code according to the environment. This is the normal mechanism to transfer control to one of these tasks.

"11"—Vectored Pointer Indirect

Use T_VALUE to select a vector which will address the pointer register-file. A vector is used to select one of several tasks, and the pointer register-file is then used to locate the specific code for that task. For instance, to select (a) read a new source word, (b) extract a source character, (c) micro-op completed.

Since a principal function of this BOPS sequencing is to allow the implementation of the EIS Multi-Operand Character instructions, specific pointer registers can be primarily assigned to specific tasks and special characteristics added. Therefore, the least significant bit of the address from the pointer register-file may be "OR-ed" with a logical condition to create an additional two-way vector branch. Since the condition is "OR-ed" with the least significant bit of the address from the pointer register, the address contained in the register-file must be even. An odd address will effectively subvert this logic, and that this characteristic is used to advantage in the exemplary processor. Those skilled in the art will understand that the additional vector branch capability can readily be expanded, if necessary, by making the supplementary field more than one bit long.

Example: pointer [2] is used to locate the code to extract one source string character, so if pointer [2] is selected, then the least-significant bit of the Source-Character-Counter is OR-ed with the contents of pointer [2] to form a final BROM address. The Source-Character-Counter is a character-within-word counter.

For four-bit source characters, this allows one word for the extraction of the most-significant four-bit character within a nine-bit byte and a second word to extract the least-significant four-bit character.

For six-bit or nine-bit source characters, only one word is needed, and two options are available: (1) duplicate the word in both the even and odd locations, or (2) locate one word at the odd address which would allow the even-addressed word to be available for some other use.

For the destination string insertion, the Destination-Character-Counter is used with pointer [4]. The Destination-Character-Counter is a character-within-word counter. For four-bit destination characters, the least significant bit is used. For six-bit characters (which are assembled a word at a time), the logic needs to be modified to (1) first five characters within the word and (2) the last character within the word.

Pointer [6] is used for entry to the edit micro-op specific code. The logic to modify the least-significant-bit is selected as part of the micro-op initialization.

By defining standard uses for each of the pointers, various pieces of code can be generated as universal functions. The standard uses of the eight pointers in the exemplary CPU are defined to be:

0 Last-Access-of-Memory-Page Handler;
1 Exact a source character;
2 Get a new source word;
3 MOP (or BOP task) complete;
4 Insert a destination character;
5 Read final destination word/byte;
6 MOP specific operation (character process);
7 Reserved.

A mass load of all of the pointers occurs during the initialization of an EIS multi-operand instruction under the direction of MINST. Since the pointers are nine bits each, multiple pointers can be loaded, for example, from a single XRAM word. By grouping the pointers such that the source-string character-type dependent pointers are loaded in one group and the destination (or operand-2) character-type pointers are loaded in another group, most of the pointers can be loaded as a by-product of the operand-descriptor processing.

BOPS will accept a new address from MINST only when it is in an idle state. While BOPS is sequencing, it can be put back into an idle state by using a Vector-within-Page branch where the vector is specified as zero. Word 0 of BROM defines idle condition actions. If the BROM address is zero or is switching to zero, BOPS is considered to be idle.

There are conditions under which MINST must stop the BOPS sequence. This can be accomplished by piping an address of "1" to BOPS which will have the effect of putting BOPS into an idle state and will allow BOPS to be freed from waiting on a cache handshake or for M_CTL to be cleared.

The character types for a specific MRL instruction are fixed for all of the micro-operators executed for the MRL, so the character-type decisions can be made once during the initialization of the MRL instruction. This is accomplished by creating a set of pointers (the pointer register file) that address the code for each of the steps. The pointers for steps 1 and 2 are set according to the source string character type; the pointers for steps 4 and 5 are set according to the destination string character type; the step 3 (and perhaps step 6) pointer is set as part of the individual edit micro-op initialization.

The circuitry of FIGS. 3 and 4, taken together, will now be considered in more depth. These FIGs. illustrate the details of a presently preferred embodiment of the BROM controller 35 shown in FIG. 2.

The initial basic operations function addressed by MINST includes, in the case of an EIS instruction, an M_CTL value which is applied (BROM VALUE) to the data inputs of a MUX 40 (FIG. 3) which also has input thereto the operand 1 and operand 2 page-cross indicator flags. The selection of these inputs is determined by the content of the M_CTL VALUE applied to a decoding network including inverter 41, NOR-gate 42 and inverter 43. It will be seen that if this value is 0001, then the last operand input will be passed to the output of the MUX 40, else the M_CTL VALUE will issue. The output from the MUX 40 is applied as a data input to another MUX 44.

The MUX 44 has two additional data inputs: zero and the contents of M_CTL2 register 45. The output from MUX 44 is applied to the M_CTL register 46 which, as previously mentioned, provides vector branch information to MINST. In addition, the contents of M_CTL 46 are looped back to M_CTL2 45, M_CTL being under control of the P1 clock phase and M_CTL2 being under control of the P2 clock phase such that the contents of M_CTL2 always reflects that of M_CTL, delayed one clock phase.

The control inputs to MUX 44 include: a default which simply clocks the current value of M_CTL2 back into M_CTL; a reset from MINST which clocks zero into M_CTL; and a control input from AND-gate 47 which serves to clock the output from MUX 40 into M_CTL. If the contents of M_CTL2 45 are zero, a NOR-gate 48 issues a "1" to indicate this fact to MINST. The output from NOR-gate 48 is applied directly to one input leg of another AND-gate 50 and is also applied to an inverter 49 which drives one input leg of AND-gate 47. The second inputs of each of the AND-gates 47 and 50 are driven by the BOP_SET_MCTL bit from the BROM WORD.

Thus, the AND-gate 47 can be fully enabled if the contents of M_CTL2 are not zero, and will be fully enabled if the BOP_SET_MCTL bit from the BROM WORD is a "1"; under these conditions, the output from MUX 40 will be clocked into M_CTL 46. However, if the contents of M_CTL2 are zero and the BOP_SET_MCTL bit from the BROM WORD is a "1" AND-gate 50 is fully enabled and issues a signal which will "halt" BOPS as previously discussed.

Referring now to FIG. 4, the BROM 33 issues, in response to receiving a BOP ROM ADDRESS (BRA) signal set, a basic operations sequence control word to a latch 50 from which five bits in two fields are decoded to obtain T_TYPE and T_VALUE. An eight word pointer register bank 51, previously loaded with a set of vectors specific to the individual EIS instruction identified by MINST, is addressed from OR-gate array 52 which is alternatively driven by the outputs from AND-gate arrays 53, 54. AND-gate array 54 receives address information from register array 55 which is passed to the pointer register bank 51 if T_TYPE is "11". (Register array 55 is deemed to contain eight three-bit addresses of out-of-page vectors which are selected by T_VALUE (vector value). In a VLSI implementation of the CPU incorporating the invention, the register array 55 might simply be a MUX to permit selecting an address provided from some other logic, not shown.) If T_TYPE is "10" then T_VALUE is passed through AND-gate array 53 and OR-gate array 52 to address the eight-word pointer register bank 51.

If the next BROM word needed is on the same "page" the current address, stored in BOP ROM address register 60, need only be modified in the lower order bits or "offset"; this is the case if T_TYPE is either "00" or "01". The offset value is transferred from the output of an OR-gate array 57 to a MUX 56 which also receives as an input the higher order six bits of the address currently temporarily stored in the BOP ROM address register 60. OR-gate array 57 is driven alternatively by AND-gate arrays 58, 59. It T_TYPE is "00", T_VALUE is passed directly through AND-gate array 59 and OR-gate array 57 to the MUX 56 to serve as the offset. However, if T_TYPE is "01", the three-bit offset in register array 61 specified by T_VALUE is passed through AND-gate array 58 and OR-gate array 57 to the MUX 56. (Register array 61, like register array 55, may, in a practical VLSI embodiment, simply be a MUX which receives the several selectable addresses from other logic, not shown.)

As previously noted, if T_TYPE is "10" or "11", the eight-word pointer register bank 51 is addressed and issues bits 0:7 of a pointer address to MUX 56 for transfer to the BOP ROM address register 60 as a data input. The lowest order bit X of the BROM address thus formed is received from an OR-gate 62. One input to OR-gate 62 is from bit eight of the addressed pointer word stored in the pointer register bank 51. A second input to OR-gate 62 is from another OR-gate 63; it will therefore be understood that if either bit eight of the addressed pointer or the output from OR-gate 63 is a "1", the X will be "1", else it will be "0". This provides an even-odd addressing facility which, as previously noted, can be employed to provide an additional two-way vector branch.

Various conditions can cause bit "X" of the BAR register 60 to be set to "1" through the OR-gates 63, 62. It will be observed that, in the exemplary CPU, enablement of any one or more of the AND-gates 64, 65, 66, 67 will enable the OR-gate 63.

The AND-gate 64 is driven by the PSEL=1 and S_CC 2:1 signals and will be enabled if both are "1". PSEL=1 means that the pointer selector is indicating that a source character is being extracted, and S_CC 2:1 means that the source character counter (not shown), which tracks the number of characters remaining to be processed in a current source word, is odd.

The AND-gate 65 is driven by the D_CC 2:1 and the PSEL=4 signals and by the ICF signal after it has been inverted through the inverter 68. D_CC 2:1 means that the destination character counter is odd. PSEL=4 means that the pointer selector is indicating that a source character is to be inserted in the destination word, and ICF (inverted) means that the insert character function is enabled.

The AND-gate 66 is driven by the (D_CC 0:2)=0, ICF (non-inverted) and PSEL=2 signals. AND-gate 66 is used to toggle between two processes while writing six-bit characters or nine-bit characters: insert all but the last character in the destination word and insert the last character in the destination word.

The AND-gate 67 is driven by the PSEL=3 signal and a signal issued from a four-bit register array 69 (which, as previously noted with respect to the register arrays 55 and 61, may, in a practical VLSI implementation, be a MUX receiving information from other logic, not shown) which receives select information from the two-bit address CFS (character select function). The contents of the register array 69 (or signals received if a MUX) are SF, SN, ES and either ES or OP9NZ which are OR-ed by the OR-gate 70. SF is a select flag which is set/reset to allow selection of a forced "1" or "0". SN means sign negative; ES means end suppress; OP9NZ means that the four least significant bits of the character just extracted are non-zero.

The foregoing examples of signals and conditions which can affect the state of OR-gate 63 are merely exemplary and will vary with a given environment. As previously noted, if additional supplementary branch vectors are desired, the X field may be increased to more than one bit.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a central processing unit including memory means in which are stored words including instructions and operands; an address and execution (AX) unit comprising:

A) a main controller and a basic operation (BOP) controller;

B) the main controller including a main sequencer and an MROM, said MROM storing main control words, said main sequencer in response to the AX unit receiving an instruction word from said memory means for producing an MROM address at which address is located a main control word, a main control word including control signals for causing the AX unit to perform selected ones of the following actions such as to generate a memory address, to produce control signals to read a word from the memory means, to write a word to the memory means, to transmit BROM control signals to the BOP controller;

C) said BOP controller including a basic operation (BOP) sequencer and a BROM, said BROM storing basic operation control words, the BOP sequencer in response to the receipt of BROM control signals from the main controller for producing a BROM address at which address in the BROM is located a BOP control word, each BOP control word including control signals for causing the AX unit to execute a basic operation during one clock period, said basic operations including shift and character manipulation operations; the BOP controller also including BROM address register means for storing a BROM address; BROM pointer register means for storing a plurality of BROM addresses; and selection circuit means for selecting one of the BROM addresses stored in the BROM pointer register means and for writing the selected BROM address into the BROM address register means;

D) the main controller in response to receiving an instruction to move a plurality of characters from a sending string of characters of a plurality of sending operand words specified in a sending descriptor word to a receiving string of characters written into a plurality of receiving operand words specified in a receiving string descriptor word with one character being moved at a time, hereafter referred to as an EIS instruction; the movement of a Character from its sending string to its receiving string requiring a sequence of basic operations to be executed by the AX unit; the main controller in response to the receipt by the AX unit of an EIS instruction producing a main control word, said main control word causing BROM addresses to be written into the BROM pointer register means, and the BROM control signals of the main control word causing the BOP sequencer to apply a BROM address to the BROM causing the BROM to produce a BOP control word including a BOP sequence control field, the BOP sequence control field of the BOP control word in execution being applied to the selection circuit means of the BOP controller, the BOP sequence control field determining the BROM address written into the BROM address register means, the address of the next BOP control word to be executed in a sequence of BOP control words to be executed by the AX unit in executing an EIS instruction; the main controller asynchronously producing main control words while an EIS instruction is in execution by the AX unit for generating a memory address of a sending operand and read control signals for the memory means for causing the memory means to read the sending operand from the memory means and to transmit the sending operand to the AX unit as required during the execution of an EIS instruction, and for generating a memory address for a receiving operand and write control signals for the memory means for causing the memory means to write a receiving operand into the memory means as each receiving operand is produced and transmitted by the AX unit to the memory means during the executing an EIS instruction;

E) said BOP controller further including communication circuit means by which the BOP controller communicates to the main controller the current status of the BOP controller while executing an EIS instruction.

2. In the central processing unit of claim 1 in which a character comprises four, six, or nine bits.

3. In the central processing unit of claim 1 in which the communication circuit means of the BOP controller includes a main control register into which is written signals from a basic operation control word in execution while an EIS instruction is in execution.

4. In the central processing unit of claim 3 in which the current status of the BOP controller has three values; (1) the BOP controller is executing an EIS instruction independently of the main controller; (2) the BOP controller requires an action by the main controller before it can continue executing an EIS instruction in execution; or (3) the BOP controller has completed execution of an EIS instruction.

5. In the central processing unit of claim 1 in which a character as it is moved from the sending string of characters to the receiving string of characters is modified as specified by the BOP control word in execution.

6. In the central processing unit of claim 1 in which the BROM pointer register means has the capacity for storing eight BROM addresses.

7. In the central processing unit of claim 6 in which a BROM address consists of nine bits.

8. In the central processing unit of claim 7 in which a BOP sequence control field comprises two fields, a type field and a value field.

9. In the central processing unit of claim 8 in which the type field consists of two bits and the value field consists of three bits.

* * * * *